No. 747,633. PATENTED DEC. 22, 1903.
J. PELLINGTON.
COUPLING DEVICE.
APPLICATION FILED JULY 15, 1903.
NO MODEL.
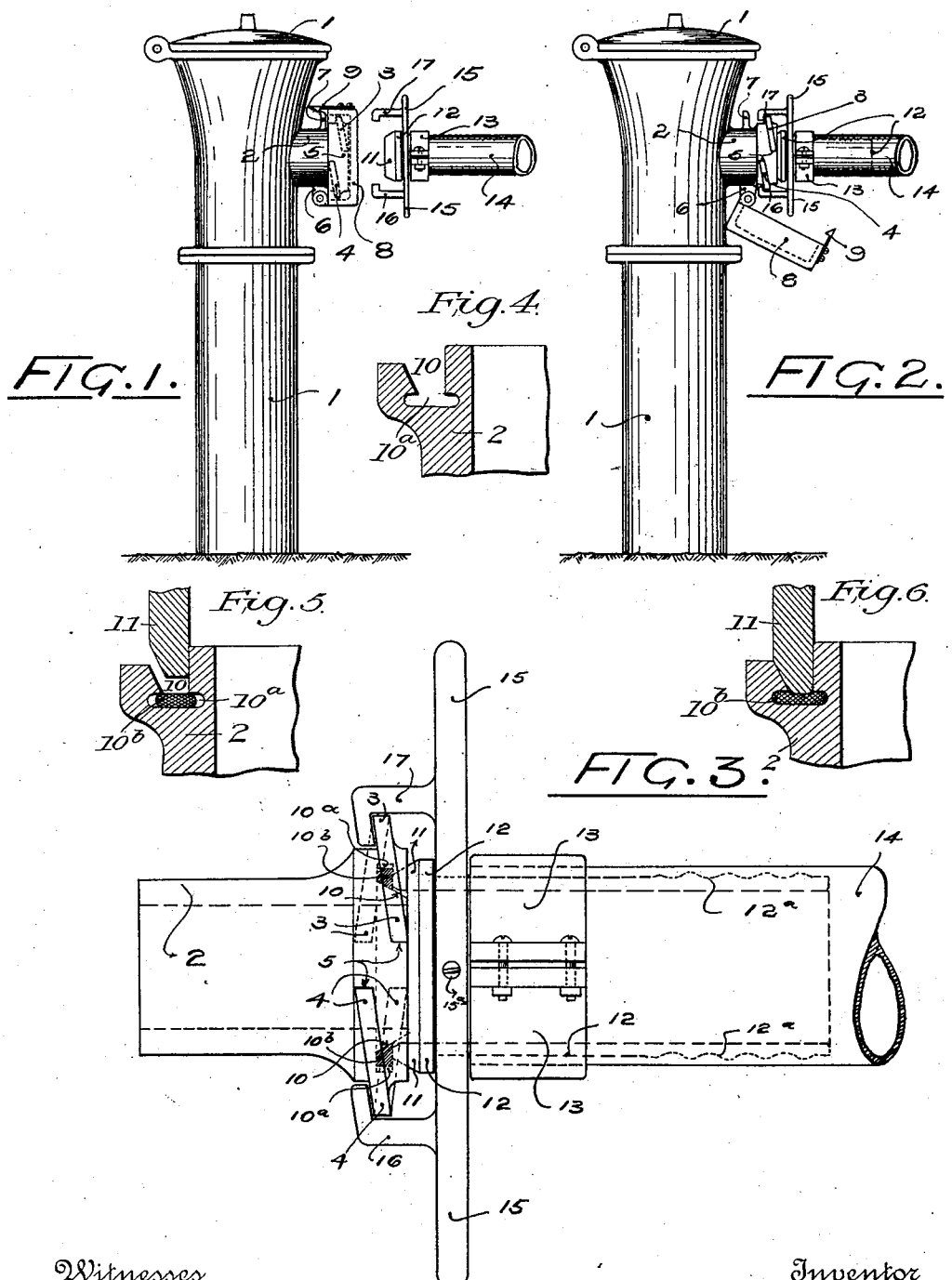

No. 747,633.

Patented December 22, 1903.

UNITED STATES PATENT OFFICE.

JAMES PELLINGTON, OF PATERSON, NEW JERSEY.

COUPLING DEVICE.

SPECIFICATION forming part of Letters Patent No. 747,633, dated December 22, 1903.

Application filed July 15, 1903. Serial No. 165,554. (No model.)

*To all whom it may concern:*

Be it known that I, JAMES PELLINGTON, a citizen of the United States, residing at Paterson, in the county of Passaic and State of New Jersey, have invented certain new and useful Improvements in Coupling Devices, of which the following is a specification, reference being had therein to the accompanying drawings.

My invention relates to improvements in coupling devices which may be used in coupling lengths of hose, in coupling a hose to a hydrant or engine, or in coupling tubular conduits for water, gas, or electric wires or cables.

The objects of my invention are to provide a coupling that will be economical by reason of the time and labor saved in its use, to produce a coupling device that will be simple in construction, easily operated, and durable, and to produce an air-tight and water-tight joint and means for locking and unlocking the same. I attain these objects by the coupling device illustrated in the accompanying drawings, in which—

Figure 1 is an elevation of a hydrant and a piece of fire-hose fitted with my coupling device, the hose being disconnected and the hydrant-opening being covered with a hinged cap; Fig. 2, a similar view with the hinged cap dropped and the members of the coupling device connected; and Fig. 3, an enlarged detailed view of my coupling device, the members being connected. Fig. 4 is a detail sectional view showing the recess in the coupling end of the female member of my coupling device which is adapted to receive the tapering nose portion of the male member and showing the groove for the packing-ring. Fig. 5 is a similar view with packing-ring inserted in said groove and showing the tapering nose portion of the male member entering the recess of the female member; and Fig. 6 is a like view showing the tapering nose portion of the male member inserted into the recess in the female member, causing the packing-ring to spread out and fill the groove which holds it.

Similar numerals refer to similar parts throughout the several views.

The hydrant 1 is provided with the usual member 2, upon which the female member of my coupling device may be screwed, or the member 2 may be constructed like the female member of my coupling device and may be suitably secured to the hydrant.

When the hydrant is not in use, the cover 8, which is hinged to the lug 6, may be closed over the female member of my coupling device and may be held closed by a spring-catch 9, which engages the lug 7, or by any other suitable locking device. The female member of my coupling device will be hereinafter described and referred to as the part 2.

The female member of my locking device is provided with an annular recess 10 at its coupling end, and in said recess there is formed an annular groove $10^a$ to receive and hold in position the rubber packing-ring $10^b$.

The male member 12 of my coupling device is provided at its coupling end with an annular shoulder, which terminates in a tapering or cone-shaped portion 11, adapted to enter and snugly fit in the recess 10 of the female member, and the other end of the male member 12 is provided with the corrugated or threaded portion $12^a$, adapted to enter the hose or other conduit 14 which is to be coupled.

When a fire or other hose is to be coupled, the usual clamp 13 or any other suitable means may be employed to secure the hose around the end $12^a$ of the male member 12. Around the male member 12 is loosely fitted a two-handled key-ring 15, so as to turn easily on the member 12 between its shoulder, above mentioned, and the inner end of the hose 14, which surrounds the male member. The said key-ring 15 is provided with the angle-hooks 16 and 17, which hooks when the cone-shaped end of the male member enters the cone-shaped recess in the female member pass between the ends of two spirally-formed ridges 3 and 4 on the outer surface of the female member 2, the said spiral ridges being separated by the space 5.

In Fig. 3 the solid lines of the ridges 3 and 4 show the incline of the ridges on one side of the female member, and the dotted lines show how the ridges incline on the opposite side, the ends of the ridges on each side being diagonally opposite, so that when the angle-hooks 16 and 17 pass through the spaces 5 and the key-ring 15 is turned both of the angle-hooks 16 and 17 simultaneously ride up the inclined surfaces of the spirally-formed ridges 3 and 4 on opposite sides of the female member, thus drawing the cone-shaped nose of the male member into the recess of the female member and against the rubber packing-ring $10^b$, which is confined within the groove $10^a$ in the lower portion of the recess 10. It is therefore obvious that less than one-half of a turn of my key-ring locks the male and female members of my coupling device securely together and that the rubber ring assists in holding the parts together, also causing an air-tight and water-tight joint.

While there is little possibility of an accidental loosening or disconnection of the parts, any suitable devices may be employed to secure my key-ring 15 against accidental movement which would cause the members of my coupling device to become disconnected. One means, which is a very simple one, is the screw-bolt $15^a$, which is shown in Fig. 3. When my coupling device is used for connecting metallic tubes either over or under ground, the use of said screw-bolt or any other suitable means for preventing the disconnection of the coupling members would be advisable.

In Fig. 3 my coupling device is shown in enlarged detail, and consists of the three parts or members—the male, the female member, and the key-ring 15. The use of my coupling device in connecting lengths of hose or connecting hose to a fire-hydrant will save considerable time and labor, as a connection can be made with greater ease and rapidity.

When lengths of hose are coupled by my device, the handles of the key-ring 15 may be utilized in carrying the hose from one place to another.

With this description of my invention, what I claim, and desire to secure by Letters Patent, is—

1. In a coupling device, a female member, provided on its outer surface with spirally-formed ridges leaving a space between their diagonally opposite ends, having an annular recess in its coupling end, and an annular groove in said recess adapted to receive and hold a packing-ring, and such a packing-ring, in combination with a male member, having an annular shoulder and a tapering nose, and a key-ring, fitted loosely on the male member behind said shoulder, provided with handles and hooks formed integral therewith, substantially as set forth.

2. In a coupling device, the combination with the member 2, provided with an annular recess 10, an annular groove $10^a$, and spirally-formed ridges 3 and 4, of a packing-ring, adapted to be held in the groove $10^a$, the member 12 provided with an annular shoulder and a tapering or cone-shaped portion 11, the key-ring 15 having handles and hooks integral therewith, and means for locking said key-ring, substantially as set forth.

3. A coupling device, comprising a female member, having on its outer surface spirally-formed ridges, the diagonally opposite ends of said ridges having a space between them on each side of said member, an annular recess in the coupling end of said member, an annular groove in said recess adapted to receive and hold a rubber packing-ring, and a packing-ring in said groove, in combination with a male member, provided with an annular shoulder and a tapering nose, and a key-ring fitted loosely on the male member, back of said shoulder, and provided with two handles, and two hooks adapted to pass through the spaces between the ends of the spirally-formed ridges on each side of the female member, and to ride up the inclined faces of the ridges, when the key is turned, to force the tapering nose portion of the male member into the annular recess in the female member, substantially as set forth.

In testimony whereof I affix my signature in presence of two witnesses.

JAMES PELLINGTON.

Witnesses:
MINNIE L. DILL,
JOHN F. KERR.